Oct. 14, 1947.  W. H. HUNTER  2,428,936
AERODYNAMIC BRAKE
Filed Sept. 10, 1943
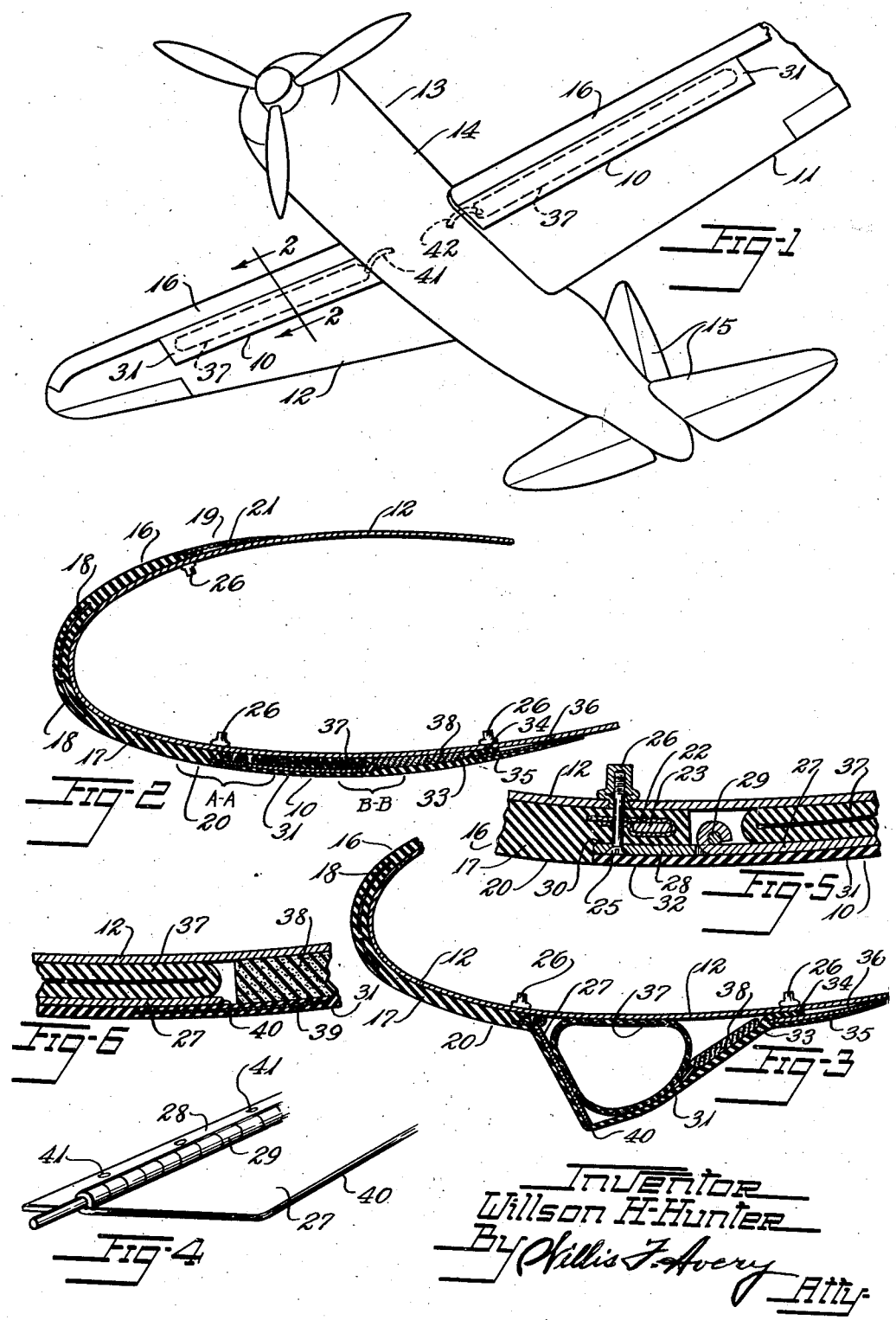

Patented Oct. 14, 1947

2,428,936

UNITED STATES PATENT OFFICE 2,428,936

AERODYNAMIC BRAKE

Willson H. Hunter, Akron, Ohio, assignor to The B. F. Goodrich Company, New York, N. Y., a corporation of New York Application September 10, 1943, Serial No. 501,784

8 Claims. (Cl. 244—113)

1

This invention relates to aerodynamic brakes and other spoilers for aircraft and is useful especially for application to wing structures and other airfoils and structures of aircraft. When the airfoil or other structure is provided with an inflatable protective covering for preventing the accumulation of ice at the leading edge thereof, the invention may be applied in association with and in continuation of such protective covering for cooperation therewith and for maintaining the desired aerodynamic characteristics of the structure, and for preventing the accumulation of ice thereon.

Principal objects of the invention are to provide an effective aerodynamic spoiler for aircraft; to provide effectively for moving an element to and from a drag-increasing position by fluid operation; to provide for elastically holding the element in a retracted position relative to the aircraft while permitting the advance of the element to the braking position; to provide for protection of the spoiler structure and mechanism; to provide for maintaining a substantially smooth aerodynamic flow of air across the spoiler in its retracted condition; and to provide simplicity of construction, and convenience of manufacture and servicing.

More specific objects are to provide an aerodynamic brake operable by inflatable means, to provide a braking structure in continuation of and cooperable with an inflatable protective covering for preventing ice accumulation on an airfoil, and to provide a braking structure generally triangular in section for presenting an edge to the flow of air when in the braking position.

These and other objects and advantages of the invention will be apparent from the following description.

In the accompanying drawings, which form a part of this specification, and in which like numerals are employed to designate like parts throughout the same, Fig. 1 is a perspective view of aerodynamic brakes mounted on an aircraft the wings of the latter having associated inflatable protective coverings, and constructed in accordance with and embodying the invention, parts being broken away, Fig. 2 is a sectional view taken along line 2—2 of Fig. 1, parts being broken away, Fig. 3 is a view like Fig. 2 but showing the brake in the braking position, parts being broken away, Fig. 4 is a perspective view of a hinged flap element of the brake, parts being broken away,

2

Fig. 5 is a sectional view in an enlarged scale at the region A—A of Fig. 2, and Fig. 6 is a sectional view in an enlarged scale at the region B—B of Fig. 2.

In the illustrative embodiment of the invention shown in the drawings, aerodynamic brakes 10, 10 are mounted on the lower surfaces of wings 11 and 12 of an aircraft 13, which aircraft includes a fuselage 14 and tail unit 15, although other locations may be utilized, if desired. The aircraft 13 may also be provided with inflatable protective coverings 16 disposed at the leading edges of the wings for preventing the accumulation of ice thereon. The protective covering, or shoe, 16 preferably is elastic and adapted to be mounted in a condition of stretch upon the wing 12 or airfoil and includes a sheet 17 of elastic material, such, for example, as resilient rubber or other rubber-like material, and an inflatable tube or tubes 18 at the leading edge of the wing 12, and which may be made of extensible or substantially non-extensible woven fabric impregnated or coated with a suitable rubber-like material. The shoe is an elongate structure preferably tapering in width in accordance with the tapering thickness of the air foil.

At the upper and lower margins 19 and 20 of the shoe 16, attaching means are provided for mounting the shoe on the airfoil, which margins may be attached in substantially the same manner except that the lower margin 20 is not provided with a fairing strip 21, but is constructed as shown especially in Fig. 5, in order to permit the continuation of the brake structure with the shoe. A fabric strip 22 is provided along the margins 19 and 20 of the shoe and united to the rubber thereof, the strip being folded to accommodate a metallic strip element 23, which may be of flat wire, extending throughout the margins of the shoe.

For attaching the shoe 16 to the wing 12, screws 25 are disposed through the shoe just inside the wire 23, the screws being mounted in hollow threaded rivets 26 set into the metal surface of the wing, and the arrangement being such that the wire 23 behind the screws 25 is adapted to maintain the shoe in a condition of tension between the upper and lower margins 19 and 20. The fairing strip 21 may be provided over the upper margin 19 of the shoe at the wire 23 to provide an even surface for the air flow and this strip may also be held in place by the screws 25.

The construction shown especially in Fig. 5 provides for attaching the lower margin of the protective covering 16 and provides for arranging the aerodynamic brake 10 in continuation therewith and additionally facilitates mounting the brake to the lower metal surface of the wing 12. Such an arrangement also provides surface continuity and facilitates maintaining the aerodynamic characteristics of the surface.

The brake 10 includes a substantially flat flap element 27 of stiff material such, for example, as steel or aluminum sheet, which element is desirably hinged in the manner shown especially in Figs. 3, 4 and 5. The flap element 27 has a portion 28 extending from a hinge 29, which portion 28 may be secured at the lower margin 20 of the shoe 16 by screws 25 extending through apertures 41 in the portion 28. The flap element 27 is disposed such that the hinge 29 overlies the surface of the wing 12, while the portion 28 is disposed in a recess 30 extending along the lower margin 20 of the protective covering 16.

The brake 10 also includes an elastic covering 31 of suitable rubber-like material overlying the flap element 27 and preferably held in a condition of tension between front and rear margins, which maintains the flap 27 in a depressed position as shown especially in Fig. 2. The elastic covering 31 may be attached at its front margin 32 to the protective covering 16 and to the portion 28 of the flap 27 by a suitable adhesive material, such, for example, as rubber cement, the elastic covering 31 being of such thickness as to be disposed within the recess 30 whereby a flush outer surface at the region of juncture of the margins 20 and 32 is provided.

The rear margin 33 of the elastic covering 31 is desirably divided for providing an inner portion 34 and an outer extension 35, and a metal fairing strip 36 is disposed between the inner portion 34 and the extension 35 and also is disposed between the outer extension 35 and the wing 12, as shown especially in Figs. 2 and 3. The rear margin 33 may be attached to the wing 12 by means of screws like screws 25 extending through the fairing strip 36 and the portion 34 and engaging hollow threaded rivets 26. The inner portion 34 and the outer extension 35 of the elastic covering 31 may be adhered to the fairing strip 36 by a suitable adhesive. This construction provides for tapering the brake 10 to a thin edge at the region of the rear margin 33 for facilitating smooth flow of air while providing for placing the elastic covering 31 in a condition of tension.

The brake 10 includes an inflatable tube 37 of elongate form which may be extensible or substantially non-extensible in its walls, and which may be of suitable woven fabric impregnated or coated with suitable rubber-like material, or may be made wholly of rubber-like material. The inflatable tube 37 is disposed between the flap element 27 and the wing 12, and may be positioned directly against the flap element 27. A filler element 38 of suitable material such, for example, as sponge rubber, may be adhered by suitable adhesive to the elastic covering 31 and disposed between the inflatable tube 37 and the divided rear margin 33 and between the elastic covering 31 and the wing 12 for maintaining the outer surface of the brake 10 even from the inflatable tube to the region of the rear margin 33.

The margins of the elastic covering 31 are attached in the manner described hereinabove for maintaining the covering 31 in a state of tension, and in the preferred construction the covering 31 is not adhered to the flap element 27 except at the portion 28 thereof so that the covering can stretch and have movement relative to the flap during inflation of the tube 37.

As shown especially in Fig. 6, the elastic covering 31 may be provided with a reinforcing strip 39 of woven fabric or other suitable material disposed at the region of the edge 40 of the flap 27 where the covering is bent over such edge in the operation of the brake. The rubber and fabric parts of the inflatable protective covering 16 and the aerodynamic brake 10 are united preferably by vulcanization.

In operation, the inflatable tubes 18 of the protective coverings 16, 16 may be connected to a suitable source of supply of pressurized air, for example, and inflated in a cyclic manner for distorting the surfaces of the protective coverings 16, 16 in order to reduce the adherence of ice formations on the outer surfaces thereof and to facilitate ice removal by the ambient air stream. The aerodynamic brakes 10 on the wings 11 and 12 may be connected to a suitable source of pressurized air disposed in the fuselage 14, for example, by hose connectors 41 and 42. When air is admitted to the inflatable tube 37 in a deflated condition, the tube progressively alters its form to assume that form as shown in Fig. 3, and presses against the flap element 27, which action moves the flap element 27 pivotally about the hinge 29 to the braking position thereby presenting an edge at 40 to the ambient air stream. The elastic covering 31 during such pivotal movement of the flap element 27 is moved outwardly from the wing 12 and is stretched substantially throughout its extent in a chord-wise direction, hence becoming in a condition of greater tension than when in the retracted position.

As noted hereinabove, when the elastic covering 31 is not adhered to the flap element 27 except at the portion 28 it is stretched throughout its chord-wise extent; whereas, when wholly adhered to the flap element 27, the elastic covering 31 is stretched only in that portion extending from the flap edge at 40 to substantially the margin 33. It is desirable that the elastic covering 31 be not wholly adhered to the flap 27 in order that some stretching action of the rubber-like material may be induced at its marginal junction with the rubber-like material 17 of the protective covering 16 at the lower margin 20 for coacting with the rubber-like material 17 in assisting in reducing adhesion of ice accumulation to the outer surface of the protective covering 16 and the aerodynamic brake 10. During the outward movement of the elastic covering 31 the filler element 38, being adhered thereto moves outwardly likewise and is also stretched in a chord-wise direction.

Upon deflation of the inflatable tube 37 the flap element 27 pivots about the hinge 29 under the action of the pressure of the ambient air stream and also the returning action of the stretched elastic covering 31 by virtue of the elasticity of the rubber-like material thereof. Upon completion of the deflation of the tube 37 the aerodynamic brake tends to assume the retracted condition, as shown in Fig. 2, and since the elastic covering 31 is in a condition of tension the flap element 27 is held in its starting position pressed against the inflatable tube 37 while the filler element 38 resumes its position between the covering 31 and the wing 12 as noted hereinabove. In this manner the aerodynamic brake presents an even outer surface to the flow of air without objectionable bulging and, being in continuation of the protective covering 16, coacts therewith in maintaining the aerodynamic characteristics of the wing 12.

While in the illustrative embodiment the invention is shown as applied to the lower surface of a wing, it is contemplated that the brake or other spoiler may be applied also to the upper surface of the wing, or to either or both upper and lower surfaces of the horizontal stabilizers, or upon either or both the vertical surfaces of fins, or any combination of these. The application of the spoilers to the stabilizing and fin surfaces has the advantage that increased stability at the time of braking is provided owing to their position behind the center of gravity of the aircraft.

Variations may be made without departing from the scope of the invention as it is defined in the following claims.

I claim:

1. In an aircraft wing, in combination, a protective covering disposed about the leading edge of said wing for preventing ice accumulation thereon and comprising elastic material, said covering having a rearward attaching margin and inflatable means for distorting said covering, and a spoiler structure extending rearwardly from and in continuation of said covering at said margin, said structure comprising a flap element mounted in the structure for hinged movement with respect to said wing and movable to and from a drag-increasing position, an elastic covering overlying said flap element at a face thereof and held in a condition of tension to maintain the flap in a depressed position along said wing, and an inflatable tube at the other face of said flap element and between said flap element and said wing for raising the flap to said drag-increasing position.

2. In an aircraft wing, in combination, a protective covering disposed about the leading edge of said wing for preventing ice accumulation thereon and comprising stretchable material, said covering having a lower attaching margin and inflatable means for distorting said covering, and a brake structure extending chordwise from and in continuation of said covering at said lower margin and movable from a retracted position along the wing to a braking position presenting an edge to flow of air, said structure comprising a substantially flat element of stiff material mounted in said structure at said margin for hinged movement with respect to said wing and movable to and from said braking position, an inflatable tube at a face of said element and intermediate said element and the surface of said wing for so moving said element, and elastic material superimposed on said element at the other face thereof in a condition of tension on said element and said inflatable tube, said elastic material including a portion extending chordwise beyond said element substantially flush therewith for maintaining aerodynamic continuity therewith in said retracted position and for facilitating the return of said element from said braking position by virtue of the elasticity of said elastic material.

3. Apparatus for preventing the accumulation of ice on the leading edge of an airfoil and for effecting turbulent flow of air at a region rearward of said edge, said apparatus comprising a protective covering for said leading edge comprising stretchable material having a rearward margin positionable at said region of said airfoil, inflatable means for distorting said covering to break and loosen ice deposited thereon, and means for attaching the protective covering to said airfoil, said apparatus comprising a spoiler structure extending rearwardly of the protective covering away from said margin and having a front margin in continuation of said rearward margin of said covering, said spoiler structure comprising a covering for the surface of said airfoil at said region, means for attaching the spoiler covering to said surface at said front margin and at a margin spaced therefrom in the direction of the airflow, said spoiler covering being elastic intermediate the attaching margins thereof for outward distention to a position providing a spoiler bulge and for retraction by virtue of its elasticity, and means for so distending said spoiler covering, the distending means comprising a stiff element mounted beneath the outer face of said spoiler covering and mounted at one of said margins of the spoiler covering for hinged movement with respect to a part of said spoiler covering at the latter said margin, an inflatable tubular element backing said stiff element at the inner face thereof for forcing said stiff element and said spoiler covering to the distended position, said inflatable element and stiff element being retractible under the elastic recovery of said spoiler covering, and means for inflating said inflatable element.

4. A retractible spoiler for the unrecessed skin surface of an airfoil comprising a thin covering for said surface substantially maintaining the aerodynamic characteristics of the surface in the retracted position of the spoiler, said covering comprising a flap element of stiff material hinged in the covering for movement from a retracted position within the thickness of the covering to an advanced spoiler position, an inflatable tube normally flat in the uninflated condition and disposed also within the thickness of said covering in position for moving said flap element from the retracted position to the advanced position upon inflation of said tube, and a sheet element of elastic material closely overlying said flap element and tube also within the thickness of said covering and stretchable upon advance of said flap element and contractible to retract said flap element and flatten said tube upon deflation of the latter to restore the thin condition of said covering.

5. A retractible spoiler for the unrecessed skin surface of an airfoil comprising a thin covering for said surface substantially maintaining the aerodynamic characteristics of the surface in the retracted position of the spoiler, said covering comprising a flap element hinged in the covering for movement from a retracted position within the thickness of the covering to an advanced spoiler position, an inflatable tube normally flat in the uninflated condition and disposed directly beneath said flap element also within the thickness of said covering for moving said flat element from the retracted position to the advanced position upon inflation of said tube, and a sheet element of elastic material closely overlying said flap element and said tube also within the thickness of said covering and stretchable upon advance of said flap element and contractible to retract said flap element and flatten said tube upon deflation of the latter to restore the thin condition of said covering.

6. A retractible spoiler for the unrecessed skin surface of an airfoil comprising a thin covering for said surface substantially maintaining the aerodynamic characteristics of the surface in the retracted position of the spoiler, said covering comprising forward and rearward attaching margins, a flap element of substantially flat stiff material hinged in the covering at said forward attaching margin for movement from a retracted position within the thickness of the covering to an advanced spoiler position, an inflatable tube normally flat in the uninflated condition and disposed directly beneath said flap element also within the thickness of said covering for moving said flap element from the retracted position to the advanced position upon inflation of said tube, and a sheet element of resilient rubber-like material extending between said attaching margins and closely overlying said flap element and said tube also within the thickness of said covering and stretchable upon advance of said flap element and contractible to retract said flap element and flatten said tube upon deflation of the latter to restore the thin condition of said covering.

7. A retractible spoiler as defined in claim 6 in which said sheet element has a portion between said rearward attaching margin and said flap element of increased thickness as compared to the thickness of a second portion thereof overlying said flap element to provide a flush surface at the outer face of the covering.

8. A retractible spoiler as defined in claim 6 in which said sheet element at a portion thereof overlying said flap element is in unattached relation to said flap element at the outer face thereof for relative movement therebetween under the stretching and contraction of the covering.

WILLSON H. HUNTER.

REFERENCES CITED

The following references are of record in the file of this patent:

UNITED STATES PATENTS

| Number | Name | Date |
| --- | --- | --- |
| 1,506,146 | Ziemss | Aug. 26, 1924 |
| 2,011,902 | Leigh | Aug. 20, 1935 |
| 2,131,528 | Soyer | Sept. 27, 1938 |
| 2,306,759 | Sears | Dec. 29, 1942 |
| 2,343,936 | Leutholt | Mar. 14, 1944 |

FOREIGN PATENTS

| Number | Country | Date |
| --- | --- | --- |
| 272,455 | Great Britain | Dec. 1, 1929 |
| 577,093 | France | May 28, 1924 |
| 662,083 | Germany | July 7, 1938 |
| 316,434 | Germany | Nov. 27, 1919 |